United States Patent [19]

Cooper et al.

[11] 4,110,311
[45] Aug. 29, 1978

[54] MOLECULAR WEIGHT CONTROL OF POLYPHENYLENE ETHERS

[75] Inventors: Glenn Dale Cooper, Delmar; Daniel Edwin Floryan, Glenmont, both of N.Y.

[73] Assignee: General Electric Company, Pittsfield, Mass.

[21] Appl. No.: 749,762

[22] Filed: Dec. 13, 1976

[51] Int. Cl.$^2$ ............................................. C08G 65/44
[52] U.S. Cl. ................................................... 528/215
[58] Field of Search .................................... 260/47 ET

[56] References Cited

U.S. PATENT DOCUMENTS

| | | | |
|---|---|---|---|
| 3,635,890 | 1/1972 | Takemura et al. | 260/47 ET |
| 3,838,102 | 9/1974 | Bennett et al. | 260/47 ET |
| 3,951,917 | 4/1976 | Floryan et al. | 260/47 ET |
| 3,954,904 | 5/1976 | Yonemitsu et al. | 260/873 |

*Primary Examiner*—Lester L. Lee
*Attorney, Agent, or Firm*—Morgan, Finnegan, Pine, Foley & Lee

[57] ABSTRACT

Polyphenylene ethers produced by an oxidative coupling of a phenol in the presence of an oxygen-containing gas and a metal-amine complex catalyst are freed of catalyst and stabilized against molecular weight loss. Removal of the metal component and molecular weight loss control are effected by contacting the solution with a compound capable of selectively comlexing with the metal in combination with a dihydric phenol and a mild reducing agent. The process is less expensive than prior art procedures because less dihydric phenol is needed, and the metallic residue content of the polyphenylene ether is reduced to very low levels.

22 Claims, No Drawings

MOLECULAR WEIGHT CONTROL OF POLYPHENYLENE ETHERS

This invention relates to synthetic resins produced from phenols, and, more particularly, to the separation of metallic catalyst residues from and molecular weight stabilization in polyphenylene ethers.

BACKGROUND OF THE INVENTION

The polyphenylene ethers and processes for their preparation are known in the art and described in numerous publications including Hay, U.S. Pat. Nos. 3,306,874 and 3,306,875; J. G. Bennett and G. D. Cooper, U.S. Pat. No. 3,639,656; Cooper and Bennett, U.S. Pat. Nos. 3,642,699 and 3,661,848 and in copending applications of Cooper, Ser. No. 718,836, filed Aug. 30, 1976; and of Bennett and Cooper, Ser. No. 718,834, filed Aug. 30, 1976, all of which are incorporated herein by reference.

The processes most generally used to produce the polyphenylene ethers involve the self-condensation of a monovalent phenol in the presence of an oxygen-containing gas and a catalyst comprising a metal-amine complex.

At the conclusion of the reaction, the reaction solutions obtained, e.g., by oxidizing 2,6-xylenol with a copper-amine catalyst, are extracted with aqueous mineral acid or acetic acid or a mixture of water and carbon dioxide to remove the metallic component of the catalyst and the amine, before isolation of the polymer by precipitation with an antisolvent, such as methanol. It is imporant to remove the metallic catalyst residue from the reaction solution (and the polymer) because contamination of the polymer by metallic residues results in discoloration and degradation.

In J. G. Bennett and G. D. Cooper, U.S. Pat. No. 3,838,102, assigned to the same assignee herein, is described a new method which is extremely effective for removing metallic residues from polyphenylene ether reaction mixtures. The method yields polymer with very low metal content after precipitation either conventionally by adding an antisolvent or by total isolation procedures. The method of U.S. Pat. No. 3,838,102 involves adding a polyfunctional compound to the reaction mixture, the compound being capable of selectively complexing with the metallic component of the catalyst, to decompose the catalyst complex and to form a water soluble, extractable composition of the metal and the polyfunctional compound.

Molecular weight control problems are also encountered, however. It is known that, when polyphenylene ether reaction mixtures are allowed to stand for appreciable periods before isolation of the polymer, the intrinsic viscosity (I.V.) of the polyphenylene ether is reduced; the extent of the I.V. drop depends on the time between reaction and isolation, the temperature of the mixture, and probably on the conditions used in preparing the polymer. In typical large scale operations, with the reaction mixture held at 50° C., the I.V. drop is usually more than 0.1 dl./g. and drops greater than 0.2 dl./g. are not uncommon.

In practice, an attempt is made to compensate for this degradation by adjusting the polymerization conditions to prepare a polymer of substantially higher I.V. than that desired in the final product, so that after the I.V. drop between reaction and isolation, the intrinsic viscosity will fall in an acceptable range. However, this method is expensive, requiring more catalyst than would otherwise be necessary, and difficult to control, because the amount of the I.V. drop may vary widely, especially when upsets anywhere in the system cause an especially long delay in isolating the polymer. A method for preventing or minimizing the I.V. drop in polyphenylene ether reaction mixtures would, therefore, be extremely useful.

German Patent Publication No. 2430130, Jan. 23, 1975, discloses a method for stabilizing I.V. in polyphenylene ether reaction mixtures by adding a mixture of a dihydric phenol such as hydroquinone or catechol, or a benzoquinone, and a mild reducing agent, such as sodium sulfite. The publication teaches that the dihydric phenol should be used in an amount greater than two moles per gram-atom of the copper or other metal catalyst used in the polymerization, and preferably, at a level of at least 5 moles per gram-atom.

Unexpectedly, it has now been found that by treating the polyphenylene ether reaction mixture with a combination of the dihydric phenol/reducing agent and a chelating agent for the metal catalyst, such as a salt of ethylenediaminetetraacetic acid (EDTA) or nitrilotriacetic acid (NTA), intrinsic viscosity degradation may be prevented with much smaller amounts of the dihydric phenol than are taught to be necessary in the German publication, above-mentioned. Surprisingly, neither the chelating agent nor the low amounts of dihydric phenol/reducing agent suitable for use in the combination when used alone have any appreciable effect in reducing the rate or extent of the I.V. drop. Illustratively, stabilization has been achieved at catechol: copper ratios of 0.36:1. This is less than one-fifth the minimum amount said to be necessary in the German publication. This ratio is further reducible. A more than merely additive effect is seen by using the combination. Obviously, such a reduction in the amount of the dihydric phenol is important because of the cost since the dihydric phenol is by far the most expensive component of the stabilizer system. Moreover, also avoided or minimized are problems in waste water disposal caused by the bactericidal activity of the dihydric phenols. It is a common practice to hold aqueous waste in treatment ponds, where the organic components are digested by bacteria and other microorganisms to reduce the chemical oxygen demand of the water to an acceptable level before it is discharged into the streams. Hydroquinone and catechol are about 20 times as lethal to typical microorganisms as is phenol (Water Quality Criteria, State of California Water Control Board, Publication 3A, 2nd edition).

Obviously, high concentrations of dihydric phenols would kill the microorganisms and prevent the treatment pond from doing its job. Thus, the use of less of this component is a substantial beneficial advantage.

DESCRIPTION OF THE INVENTION

According to the present invention, in a process for forming a polyphenylene ether by an oxidative coupling reaction in the presence of a chelatable metal ion-amine complex catalyst comprising passing an oxygen-containing gas through a reaction solution of a phenol and said catalyst, the improvement comprises terminating the reaction and stabilizing the polymer against degradation by contacting the reaction solution with (i) a chelating agent for such ion in combination with (ii) a dihydric phenol and a reducing agent, and recovering the polyphenylene ether from the reaction solution.

The term "polyphenylene ether" includes those polymers disclosed and claimed in Hay, U.S. Pat. Nos. 3,306,874 and 3,306,875, whenever produced by an oxidative coupling reaction comprising passing an oxygen-containing gas through a reaction solution of a phenol and a metal-amine complex catalyst. The term in it broadest sense includes various copolymers and blends of the polyphenylene ethers formed by interpolymerization with other monomers or polymers, such as the polyolefins, polystyrenes, polycarbonates, and the like.

In general, the polyphenylene ether resins will be of the formula:

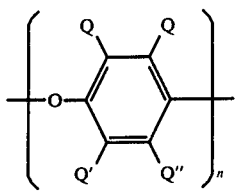

wherein Q is a monovalent substitutent such as hydrogen, a hydrocarbon radical, a halohydrocarbon radical having at least two carbon atoms between the halogen atom and the phenyl nucleus, hydrocarbonoxy radicals and halohydrocarbonoxy radicals having at least two carbon atoms between the halogen atom and the phenol nucleus, Q' and Q'' are the same as Q and in addition, halogen, with the proviso that Q, Q' and Q'' are all free of a tertiary alpha-carbon atom, and $n$ is a whole integer equal to at least 50.

The polyphenylene ethers are made by treating a solution of the corresponding phenol, optionally substituted with chlorine, bromine or iodine in the para-position, with an oxygen-containing gas in the presence of a metal-amine complex catalyst. The metal component can comprise copper, manganese, cobalt, nickel, vanadium, chromium and salts thereof, but copper is preferred. Primary, secondary and tertiary amines may be used as the amine component of the catalyst. The reaction solvent can be halogenated aliphatic solvent, e.g., trichloroethylene, or an aromatic solvent, e.g., benzene, toluene, xylene, chlorobenzene, nitrobenzene, and the like, as well as many others which will be obvious to those skilled in this art. Especially preferred solvents are aromatic hydrocarbons, e.g., toluene or benzene.

The polyphenylene ether-forming reaction can be carried out under a wide variety of well-known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25° to 50° C. The degree of polymerization is primarily controlled by the reaction time, although catalyst activity, promoters, temperature, oxygen flow rate and other parameters have known effects. To save unnecessarily detailed explanation of these known process details, reference is made to the above-mentioned Hay patents.

At the point where the polymerization reaction reaches the desired degree of polymerization, and the polymer reaches the desired molecular weight, the reaction solution will comprise a solution of polyphenylene ether, typically from 3 to 50% by weight and usually from 10 to 30% by weight, metal and amine, typically from about 0.005 to 1.5% by weight of metal, from about 0.1 to about 5.0% by weight of amine and minor amounts of other materials, such as various promoters, byproducts, unreacted monomer, and the like. Such reaction solutions are then treated with the chelating agents and the molecular weight stabilizing dihydric phenols and reducing agents in accordance with the present process.

A wide variety of chelating agents are effective in the present process, the choice being primarily dictated by economic considerations. They may be organic as well as inorganic in nature. In general, however, the preferred agents will comprise a polyfunctional carboxylic acid containing compound, such as sodium potassium tartrate, nitrilotriacetic acid, citric acid, glycine and especially preferably, they will be selected from polyalkylenepolyamine polycarboxylic acids aminopolycarboxylic acids, aminocarboxylic acids, polycarboxylic acids and their alkali metal, alkaline earth metal or mixed alkali metal-alkaline earth metal salts. For example, the preferred agents will include ethylenediaminetetraacetic acid, hydroxyethylethylenediaminetriacetic acid, diethylenetriaminepentaacetic acid and their salts. Special mention is made of ethylenediaminetetraacetic acid or a mono-, di-, tri and tetrasodium salt thereof and of nitrilotriacetic acid and their corresponding salts. In addition, polyamines, e.g., of the formula:

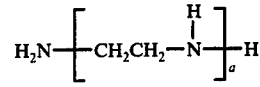

wherein $a$ is 1 to 5, such as diethylenetriamine, triethylenetetramine, can also be used as chelating agents. These are especially attractive economically because they allow elimination of any extraction step. See the copending application of Bennett and Cooper, Ser. No. 428,450, filed Dec. 26, 1973, which is incorporated herein by reference.

Although relatively large amounts of the chelating agents can be used, e.g., from 0.1 mole to about 100 moles per mole of metal ion in the reaction solution, it is economically advantageous to select an amount which is sufficient to provide from about 0.5 to about 5.0 moles and preferably, about 1 to about 2 moles of chelating agent per gram-atom of metallic catalyst component.

The suitable dihydric phenol or mixture thereof will be selected from at least one compound of the formulae:

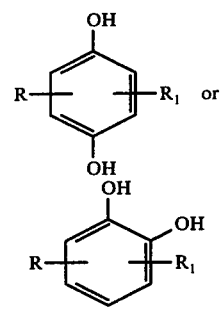

wherein R and $R_1$, independently are hydrogen or alkyl of up to eight carbon atoms. Illustratively, they will be hydroquinone, catechols, and their alkyl substituted derivatives, such as methylhydroquinone, propylhydroquinone, butyl hydroquinone, octylhydroquinone, dimethylhydroquinone, methyl catechol, dimethyl catechol, t-butyl catechol, and the like. Surprisingly, resorcinol and benzoquinone, analogs and isomers, do not prevent I.V. drops at levels which are successful with hydroquinones and catechols.

Mild reducing agents are generally suitable. A mild reducing agent is one which donates electrons readily but still is not capable of reducing the metallic ion catalyst component all of the way under the conditions of the process. Illustrative reducing agents comprise sulfur suboxides, such as sulfur dioxide or sulfurous acid, sodium bisulfite or sodium thionite, salts of metals in the lower valences of those compounds, such as tin (II) chloride, iron (II) sulfate, chromium (II) sulfate or titanium (III) chloride. Also suitable are nitrogen-containing reducing agents, such as hydroxylamines and their salts, also phosphites, such as diethylphosphite and mild organic reducing agents like glucose. Especially preferred is sodium sulfite.

Although relatively large amounts of the dihydric phenols can be used, e.g., from 2 to 10 moles per gram-atom of metal component catalyst, important advantages will be lost unless the amount does not exceed approximately 1 mole per gram-atom of metal ion component in the catalyst. The lower limit seems to be about 0.1 mole per gram-atom, and very useful results are obtained with 0.25 to 0.95 moles of dihydric phenol per gram-atom of catalyst. The reducing agent is preferably used in an amount to provide in excess of three moles per gram-atom of metal ion component in the catalyst, but lesser amounts can be used. No particular advantage will be seen in using very high amounts, e.g., more than about ten moles of reducing agent per gram-atom of ionic metal catalyst component.

The reaction solution can be contacted with the chelating agent first and then with the stabilizing combination, or it can be done simultaneously, or the order can be reversed. The chelated metallic catalyst component can then be extracted by the water produced in the polymerization reaction by centrifuging and decanting, and then the polymer can be recovered.

The manner of isolating the polyphenylene ether is not critical to the invention. For example, the polyphenylene ether can be isolated by precipitation from a reaction solution with an excess of an alcohol, such as methanol. The filtered product can be slurried in alcohol and, if desired, stirred with a decolorizing agent and then the polyphenylene ether is filtered off and converted to films, fibers, molded articles, and the like, by conventional methods.

Alternatively, because the polyphenylene ether solutions have such low metal content and the molecular weight is controlled, they lend themselves to recovery of the polymers by the so-called total isolation procedures, e.g., spray drying and steam precipitation. These are advantageous because they are more economical with respect to process energy requirements, solvent losses, and the like, than the precipitation methods mentioned above.

DESCRIPTION OF THE PREFERRED EMBODIMENTS

The following examples serve to illustrate the invention but they are not intended to limit it thereto, the parts being by weight, unless otherwise stated.

Intrinsic viscosity is determined by measurement in chloroform at 30° C.

EXAMPLE 1

A solution of 24.4 grams of cupric chloride, 38.6 grams of sodium bromide and 5.5 grams of methyltrioctylammonium chloride in 300 ml. of methanol is added to 5.1 gallons of toluene in a stirred ten gallon reactor, followed by 282 grams of di-n-butylamine. Oxygen is introduced near the bottom of the reactor at a rate of 70 cu.ft./hr. and a solution of 12.2 lbs. of 2,6-xylenol in an equal weight of toluene is added over a period of 30 minutes, with temperature maintained at 40° C. After 80 minutes, the oxygen is shut off and the reactor purged with nitrogen, 2 gallons of toluene is added, bringing the polymer concentration to 16 weight percent. The mixture is stirred for ten minutes with 255 grams of a 38% aqueous solution of the trisodium salt of ethylenediaminetetraacetic acid (EDTA) and a portion is withdrawn and the polymer is precipitated by addition of methanol. Two 120 gram portions of the mixture are withdrawn. One of these is shaken with 0.05 grams of hydroquinone and 0.15 grams of sodium sulfite (hydroquinone: Cu ratio 0.66:1) and both are then heated for 30 minutes at 80° C. The polymer is precipitated with methanol, the I.V.'s are determined, and the results are as follows:

| Conditions | I.V. |
|---|---|
| Not heated | 0.61 dl./g. |
| Heated without additives | 0.49 dl./g. |
| Heated with hydroquinone - Na$_2$SO$_3$ | 0.61 dl./g. |

It is seen that the molecular weight of the poly(2,6-dimethyl-1,4-phenylene)ether is efficiently stabilized with hydroquinone and sodium sulfite reducing agent, even though only 0.66 moles of hydroquinone is used for each gram-atom of copper ion in the catalyst. Without the stabilizer, the I.V. drops a full 0.12 dl./g.

COMPARATIVE PROCEDURE A

The stirred ten-gallon reactor described 5.5 Example 1 is charged with 4.0 gallons of toluene and a solution of 3.73 grams of cuprous oxide in 86 grams of 48% aqueous hydrobromic acid is added, followed by 55 grams of di-n-butylamine, 17.9 grams of N,N' -di-tert butylethylenediamine, 105.7 grams of butyldimethylamine, 6.6 grams of methyltrioctylammonium chloride and 3130 ml. of methanol containing 5.4% water. Oxygen is introduced at a rate of 70 cu.ft./hr. and a solution of 12.2 lbs. of 2,6-xylenol in an equal weight of toluene is added over 30 minutes. The temperature is held at 40.5° C. for the first 60 minutes and then raised to 50° C. After 100 minutes, the mixture is diluted with two gallons of toluene and 62 grams of a 30% solution of the disodium salt of nitrilotriacetic acid is added, along with 2000 ml. of water. The mixture is stirred for 15 minutes and a small sample is withdrawn and the polymer is precipitated with methanol; the intrinsic viscosity is 0.53 dl./g. The mixture is stirred for an additional three hours at 50° C. and another sample is precipitated; it has an intrinsic viscosity of 0.41 dl./g.

EXAMPLE 2

Comparative Procedure A is repeated, except that 5.5 grams of hydroquinone and 27.5 grams of sodium sulfite (hydroquinone:Cu ratio = 0.96:1) is added simultaneously with the chelating agent. The intrinsic viscosity at addition time is 0.48 dl./g.; after 3 hours at 50° C. it is still 0.48 dl./g. These data demonstrate that the molecular weight has been controlled against degradation, by the addition of the dihydric phenol and still in an amount less than one mole per gram-atom of copper ion in the catalyst.

EXAMPLES 3 and 4

The procedure of Example 2 (or Comparative Procedure A) is followed, except that the cuprous oxide is increased to 4.86 grams, the dibutylamine to 82.5 grams, the butyldimethylamine to 211 grams and the 48% hydrobromic acid to 129 grams. After 100 minutes, a 1000 gram portion is withdrawn and stirred with 4 grams of a 30% aqueous solution of the disodium salt of nitrilotriacetic acid. A portion of this mixture is precipitated immediately. Three sixty gram portions are weighed out. The first is shaken with 0.5 ml. of a 1.2% solution of catechol and 0.1 gram of sodium sulfite (catechol: Cu ratio of 0.36:1), the second with 0.5 ml. of 1.2% hydroquinone and 0.1 gram of sodium sulfite (hydroquinone: Cu ratio of 0.36:1), and the third with 0.5 ml. of water. All three are heated for 45 minutes in a constant temperature bath at 80° C. and precipitated with methanol.

The intrinsic viscosities of the dried polymers, measured in chloroform at 30° C. were:

| Example | I.V. |
| --- | --- |
| B* Not heated | 0.61 dl./g. |
| 3 Heated with catechol - Na$_2$SO$_3$ | 0.60 dl./g. |
| 4 Heated with hydroquinone - Na$_2$SO$_3$ | 0.62 dl./g. |
| C* Heated without additives | 0.42 dl./g. |

*Controls

It is seen that either catechol or hydroquinone, in restricted amounts, provides efficient molecular weight control.

Two 150 gram portions of the killed reaction mixture are heated in a bath at 50° C. A mixture of 0.015 grams of catechol (molar ratio catechol: Cu = 0.36:1) and 0.25 grams of sodium sulfite is added to one portion. The mixtures are stirred vigorously and samples are withdrawn immediately and at one hour intervals from each. The intrinsic viscosities of the polymers obtained are:

| Sample | Intrinsic Viscosity | | | |
| --- | --- | --- | --- | --- |
| | 0 hr. | 1 hr. | 2 hr. | 3 hr. |
| No treatment | .60 | .50 | .45 | .42 |
| 0.36:1 catechol:Cu | .60 | .60 | .60 | .59 |

This demonstrates that the I.V. drop produced in three hours at 50° C. is the same as that produced in 30 minutes at 80° C.

COMPARATIVE PROCEDURES D-I

These show that chelating agents alone do not prevent I.V. drop.

A series of polymerizations are carried out according to the procedure of Example 3. After the desired reaction time (80–120 minutes), the oxygen is turned off, the system is purged with nitrogen and the mixture is stirred at 50° C. under nitrogen. A sample is withdrawn immediately and the polymer is precipitated with methanol. After 90 minutes, another sample is withdrawn and the polymer isolated. The chelating agent in a ratio of 1.5 moles per mole of metal component is added and heating continued for another 90 minutes, after which another sample is withdrawn for isolation of polymer. The chelating agents used and the intrinsic viscosities of the polymers obtained are listed below.

| Example | Chelating Agent | Initial | 90 min. under N$_2$ | Additional 90 min. w/ chelating agent |
| --- | --- | --- | --- | --- |
| D* | Nitrilotriacetic acid (disodium salt) | .55 | .50 | .43 |
| E* | " | .42 | .38 | .34 |
| F* | " | .55 | .44 | .37 |
| G* | " | .52 | .45 | .40 |
| H* | " | .47 | .39 | .37 |
| I* | Sodium glycinate | .49 | .42 | .38 |

*Controls

It may be seen that the chelating agent alone is incapable of preventing the I.V. drop and has little if any effect on the rate of the drop.

EXAMPLES 5 and 6

Polymerization is carried out according to the procedure of Example 3, and after 30 minutes, portions of the mixture are withdrawn, shaken with varying amounts of hydroquinone and sodium sulfite, and heated for 30 minutes at 80° C. A second polymerization is carried out in the same way and after 80 minutes, the mixture is stirred with a 20% aqueous solution of the disodium salt of nitrilotriacetic acid (NTA) (chelating agent: Cu = 1.5:1). Portions of this mixture are shaken with hydroquinone and sodium sulfite and heated for 30 minutes at 80° C. The results are summarized as follows:

| Example | NTA | Hydroquinone | Sodium Sulfite | Initial | 30 min. at 80° C. |
| --- | --- | --- | --- | --- | --- |
| J* | none | none | none | .57 | .44 |
| K* | " | 0.18:1 | 6:1 | .57 | .44 |
| L* | " | 0.36:1 | 3:1 | .57 | .44 |
| M* | " | 2.16:1 | 3:1 | .57 | .55 |
| N* | 1.5:1 | none | none | .56 | .45 |
| 5 | 1.5:1 | 0.18:1 | 3:1 | .56 | .52 |
| 6 | 1.5:1 | 0.36:1 | 3:1 | .56 | .55 |

*Control; added reagent moles:gram-atom of copper ion.

The data provide further demonstration that stabilization can be obtained with low ratios of hydroquinone: Cu when a chelating agent is present, and that much higher ratios are required without the chelating agent.

EXAMPLE 7

Three polymerizations are carried out following the procedure of Example 3. In the first of these, the oxygen is shut off after 90 minutes and the system is purged with nitrogen. Two gallons of toluene, 2000 ml. of water, and 78 grams of a 30% aqueous solution of the disodium salt of nitrolotriacetic acid are added and the mixture is stirred ten minutes. The reaction mixture is then separated into an organic and an aqueous phase by means of a liquid-liquid centrifuge and the polymer is precipitated by addition of methanol and dried. It has an intrinsic viscosity of 0.48 dl./g., a light color, and contains less than 10 ppm of copper. The second polymerization is carried out in the same way, and the mixture is heated at 50° C. for 3 hours after addition of the chelating agent. It is then separated in a liquid-liquid centrifuge and the polymer isolated as before. The intrinsic viscosity of the polymer immediately after addition of the chelating agent is 0.50 dl./g.; the final product has an intrinsic viscosity of 0.41 dl./g. The third polymerization is carried out in the same way except that 5.5 grams of hydroquinone (0.74 moles per gram-atom of copper) and 27.5 grams of sodium sulfite are added at the same time as the chelating agent. The intrinsic viscosity immediately after this addition is 0.48 dl./g. The mixture is heated for three hours at 50° C., separated in a liquid-liquid centrifuge and the polymer isolated as before. It has a light color and contains less than 10 ppm of copper. The intrinsic viscosity is 0.48 dl./g.

Each of these polymers, 500 grams, is mixed with 500 grams of Foster-Grant 834 rubber-modified polystyrene, 10 grams of tridecyl phosphite, 15 grams of polyethylene, 30 grams of triphenyl phosphate, 1.5 grams of zinc sulfide, 1.5 grams of zinc oxide and 30 grams of titanium dioxide. The blends are extruded at 575° F. in a 28 mm twin-screw extruder and the extruded pellets are molded into standard test specimens at 500° F. in a screw injection molding machine. The properties of the products are summarized below:

| Ex. | Treatment | Elongation % | Tensile Yield (psi) | Izod Impact (ft./lbs. in.n.) | Time to Embrittlement (days at 115° C.) |
|---|---|---|---|---|---|
| 0* | Centrifuged immediately | 71 | 9400 | 4.5 | 42–46 |
| P* | Heated 3 hrs. with chelating agent alone | 73 | 9700 | 3.3 | 25–28 |
| 7 | Heated 3 hrs. with chelating agent, hydroquinone and sodium sulfite | 73 | 9800 | 4.2 | 42–46 |

*Control

These data show that I.V. is stabilized with only 0.74 moles hydroquinone/gram-atom of Cu and also that the properties of the final product are not adversely affected by heating with the combination. The composition prepared from polymer heated without the stabilizer is significantly lower in Izod impact strength and in resistance to thermal-oxidative embrittlement. The composition heated with the stabilizer has essentially the same properties as the one isolated without heating.

EXAMPLE 8

Polymerization is carried out as described in Example 1, except that the cupric chloride is increased to 29.7 grams and the sodium bromide to 45.4 grams, and the monomer addition time is extended to 45 minutes. After 2 hours, 259 grams of a 30% aqueous solution of the disodium salt of nitrilotriacetic acid is added, along with 2.75 grams of hydroquinone (0.11 moles per gram atom of copper) and 27.5 grams of sodium sulfite. Half of the mixture is separated immediately in a liquid-liquid centrifuge and the polymer is precipitated from the organic phase with methanol, washed with methanol and dried. It has an intrinsic viscosity of 0.45 dl./g. The other half of the mixture is heated for 3 hours at 50° C., centrifuged and the polymer isolated in the same way. It has an intrinsic viscosity of 0.46 dl./g.

Each polymer, 500 grams, is blended with 500 grams of Foster-Grant 834 rubber-modified polystyrene, 10 grams of tridecylphosphite, 15 grams of polyethylene, 30 grams of triphenyl phosphate, 1.5 grams of zinc sulfide, 1.5 grams of zinc oxide and 30 grams of titanium dioxide. The blends are extruded at 575° F. on a twin-screw extruder and the extruded pellets are molded into standard test bars at 500° F. in a screw injection molding machine. The properties are summarized below:

| Ex. | Treatment | Elongation % | Tensile Yield (psi) | Izod Impact (ft./lbs. in./n) | Time to Embrittlement (days at 115° C.) |
|---|---|---|---|---|---|
| 8A | Separated immediately | 72 | 9600 | 4.0 | 42–46 |
| 8B | Heated 3 hours at 50° C. | 86 | 9500 | 4.2 | 42–46 |

These data show that with a cupric halide - dibutylamine catalyst system, the intrinsic viscosity can be stabilized with only slightly more than 0.1 moles of hydroquinone per gram-atom of copper.

Other modifications in the present process can obviously be made in light of the above teachings. For example, a reaction solution of poly(2,6-diphenyl-1,4-phenylene)-ether can be substituted for the poly(2,6-dimethyl-1,4-phenylene)-ether. Mono-, tri- and tetrasodium ethylenediaminetetraacetate, calcium disodium ethylenediaminetetraacetate, hydroxyethylethylenediaminetriacetic acid, sodium potassium tartrate, sodium glycinate, diethylenetriamine and triethylenetetramine can be substituted for the sodium salts of nitrilotriacetic acid. o, m, p-Xylenes, and mixtures thereof, and trichloroethylene, can be substituted for benzene and toluene. Moreover, resorcinol can be substituted for hydroquinone, and p-benzoquinone for catechol. Instead of copper in the catalyst, the catalyst can comprise cobalt II or manganese II ions.

The invention in its broadest aspects is not limited to the specification, methods, steps and improvements shown and described herein, but departures may be made within the scope of the accompanying claims without departing from the principles of the invention and without sacrificing its chief advantage.

We claim:

1. In a process for forming a polyphenylene ether by an oxidative coupling reaction in the presence of a chelatable metal ion-amine complex catalyst comprising passing an oxygen containing gas through a reaction solution of a phenol and said catalyst, the improvement which comprises terminating the reaction and stabilizing the polymer against degradation by contacting the reaction solution with (i) a chelating agent for such ion in combination with (ii) a dihydric phenol and a reducing agent, and recovering the polyphenylene ether from the reaction solution.

2. A process as defined in claim 1 wherein the chelating agent is a polyalkylene polyamine polycarboxylic acid, an aminopolycarboxylic acid, aminocarboxylic acid, a polycarboxylic acid or an alkali metal salt, an alkaline earth metal salt or mixed alkali metal-alkaline earth metal salt thereof or a polyamine of the formula:

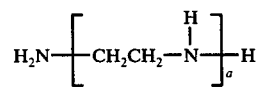

wherein $a$ is a whole number of from 1 to 5.

3. A process as defined in claim 2 wherein said chelating agent comprises ethylenediaminetetraacetic acid or a mono-, di-, tri- or tetrasodium salt thereof.

4. A process as defined in claim 2 wherein said chelating agent is nitrilotriacetic acid or a mono-, di-, or trisodium salt thereof.

5. A process as defined in claim 2 wherein said chelating agent comprises glycine or a sodium salt thereof.

6. A process as defined in claim 2 wherein said chelating agent is citric acid or a sodium salt thereof.

7. A process as defined in claim 2 wherein said chelating agent is diethylene triamine.

8. A process as defined in claim 2 wherein said catalyst is triethylenetetramine.

9. A process as defined in claim 1 wherein the chelating agent is present in an amount sufficient to provide from about 1.0 to about 2.0 moles of chelating agent per gram-atom of metal ion in the catalyst.

10. A process as defined in claim 1 wherein said dihydric phenol is selected from at least one compound of the formulae:

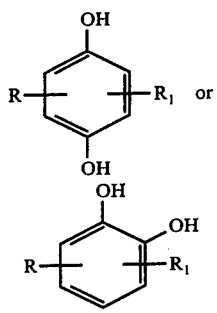

wherein R and $R_1$, independently are hydrogen or alkyl of from 1 to 8 carbon atoms.

11. A process as defined in claim 10 wherein said dihydric phenol is hydroquinone.

12. A process as defined in claim 10 wherein said dihydric phenol is catechol.

13. A process as defined in claim 1 wherein the dihydric phenol is present in an amount sufficient to provide from about 0.1 to 1.0 moles per gram-atom of metal ion in the catalyst.

14. A process as defined in claim 1 wherein said reducing agent is not so strong as to be capable of reducing the metal ion in the catalyst to a free metal under the conditions of the process.

15. A process as defined in claim 14 wherein the reducing agent is a sulfur dioxide, a salt of sulfur dioxide, a salt containing a lower valent state metal of a higher oxyacid or hydroacid, a nitrogen containing reducing agent glucose, esters of phosphoric acid, or a mixture of any of the foregoing.

16. A process as defined in claim 15 wherein the reducing agent is sodium sulfite.

17. A process as defined in claim 1 wherein the reducing agent is present in an amount sufficient to provide at least about 1.0 moles per gram-atom of metal ion in the catalyst.

18. A process as defined in claim 1 wherein the polyphenylene ether is a poly(2,6-dimethyl-1,4-phenylene)-ether having an average of at least 50 repeating units.

19. A process as defined in claim 1 wherein the metal ion component of said complex catalyst is a copper ion.

20. A process as defined in claim 1 wherein the reaction solution comprises a phenol, a copper salt-amine complex catalyst and an aromatic solvent.

21. A process as defined in claim 1 wherein the reaction solution is capable of liquid-liquid extraction with an aqueous solution and the chelate compound is separated by extraction with an aqueous medium.

22. A process as defined in claim 1 wherein the reaction solution is capable of liquid-liquid extraction with an aqueous solution, the chelate compound is separated by liquid-liquid extraction into an aqueous medium and at least part of the aqueous medium is brought into contact with the reaction mixture in admixture with said chelating agent.

* * * * *

UNITED STATES PATENT OFFICE
CERTIFICATE OF CORRECTION

Patent No. 4,110,311      Dated August 29, 1978

Inventor(s) Glenn Dale Cooper and Daniel Edwin Floryan

It is certified that error appears in the above-identified patent and that said Letters Patent are hereby corrected as shown below:

Column 3, line 15, second "Q" on right of formula should read -- Q" --.

Column 6, line 41, delete "5.5" and insert therefor -- in --

Column 6, line 46, "6.6" should read -- 5.5 --.

Signed and Sealed this

Fifth Day of June 1979

[SEAL]

Attest:

RUTH C. MASON
*Attesting Officer*

DONALD W. BANNER
*Commissioner of Patents and Trademarks*